US009060306B2

(12) United States Patent
Cedergren et al.

(10) Patent No.: US 9,060,306 B2
(45) Date of Patent: Jun. 16, 2015

(54) ESTIMATION OF CHANNEL QUALITY INDICATOR USING ADDITIONAL REFERENCE SIGNALS

(75) Inventors: Andreas Cedergren, Bjärred (SE); Anders Rosenqvist, Lund (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 205 days.

(21) Appl. No.: 13/976,772

(22) PCT Filed: Jan. 13, 2011

(86) PCT No.: PCT/SE2011/050031
§ 371 (c)(1),
(2), (4) Date: Jul. 30, 2013

(87) PCT Pub. No.: WO2012/096601
PCT Pub. Date: Jul. 19, 2012

(65) Prior Publication Data
US 2013/0315089 A1    Nov. 28, 2013

(51) Int. Cl.
*H04W 24/10* (2009.01)
*H04L 1/20* (2006.01)
*H04B 1/707* (2011.01)
*H04B 7/06* (2006.01)
*H04L 1/00* (2006.01)

(52) U.S. Cl.
CPC ............. *H04W 24/10* (2013.01); *H04B 17/309* (2015.01); *H04B 1/707* (2013.01); *H04B 7/0632* (2013.01); *H04L 1/0003* (2013.01); *H04L 1/0007* (2013.01); *H04L 1/0026* (2013.01); *H04L 1/20* (2013.01); *H04B 17/336* (2015.01)

(58) Field of Classification Search
None
See application file for complete search history.

(56) References Cited

U.S. PATENT DOCUMENTS

| 2008/0084845 | A1* | 4/2008 | Kuchibhotla et al. | 370/331 |
| 2008/0291978 | A1* | 11/2008 | Jonsson et al. | 375/144 |
| 2008/0298502 | A1* | 12/2008 | Xu et al. | 375/299 |
| 2009/0213944 | A1* | 8/2009 | Grant | 375/260 |
| 2010/0208656 | A1* | 8/2010 | Oh | 370/328 |

(Continued)

FOREIGN PATENT DOCUMENTS

| WO | 2007/132412 A2 | 11/2007 |
| WO | 2008/054267 A1 | 5/2008 |

OTHER PUBLICATIONS

International Search Report for PCT/SE2011/050031 mailed Oct. 12, 2011, 5 pages.

(Continued)

*Primary Examiner* — Hassan Kizou
*Assistant Examiner* — Hashim Bhatti
(74) *Attorney, Agent, or Firm* — Withrow & Terranova, PLLC

(57) ABSTRACT

Methods, a user equipment and a radio network node relating to estimation of a channel quality indicator, CQI, are provided. A first reference signal is carried by a downlink channel of a radio communication system. The user equipment receives from the radio network node information about scheduling of a downlink transmission to the user equipment and information about a second reference signal being different from the first reference signal. Furthermore, the user equipment receives from the radio network node the downlink transmission. The downlink transmission comprises the first reference signal and the second reference signal. Next, the user equipment estimates the CQI based on the first reference signal and the second reference signal.

21 Claims, 4 Drawing Sheets

(56) References Cited

U.S. PATENT DOCUMENTS

2010/0246527 A1* 9/2010 Montojo et al. ............ 370/330
2012/0106610 A1* 5/2012 Nogami et al. ............ 375/224

OTHER PUBLICATIONS

3GPP TS 25.211 V10.0.0, "3rd Generation Partnership Project; Technical Specification Group Radio Access Network; Physical channels and mapping of transport channels onto physical channels (FDD) (Release 10)," Sep. 2010, 58 pages.

3GPP TS 25.214 V10.1.0, "3rd Generation Partnership Project; Technical Specification Group Radio Access Network; Physical layer procedures (FDD) (Release 10)," Dec. 2010, 99 pages.

ETSI TS 125 212 V9.2.0, "Universal Mobile Telecommunications System (UMTS); Multiplexing and channel coding (FDD) (3GPP TS 25.212 version 9.2.0 Release 9)," Mar. 2010, 110 pages.

Bastug, Ahmet et al., "Common and Dedicated Pilot-Based Channel Estimates Combining and Kalman Filtering for WCDMA Terminals," Conference Record of the Thirty-Ninth Asilomar Conference on Signals, Systems and Computers, Oct. 28-Nov. 1, 2005, pp. 111-115.

Guey, Jiann-Ching et al., "Adaptive Pilot Allocation in Downlink OFDM," IEEE Wireless Communications and Networking Conference, Mar. 31-Apr. 3, 2008, pp. 840-845.

Ylitalo, Juha, "Channel Estimation Study of CDMA Downlink for Fixed Beam BTS," The 13th IEEE International Symposium on Personal, Indoor and Mobile Radio Communications, vol. 1, Sep. 15-18, 2002, pp. 242-246.

* cited by examiner

US 9,060,306 B2

ESTIMATION OF CHANNEL QUALITY INDICATOR USING ADDITIONAL REFERENCE SIGNALS

This application is a 35 U.S.C. §371 national phase filing of International Application No. PCT/SE2011/050031, filed Jan. 13, 2011, the disclosure of which is incorporated herein by reference in its entirety.

TECHNICAL FIELD

The present disclosure relates to the field of telecommunication. In particular, the present disclosure relates to a method in a user equipment and a user equipment for estimating a channel quality indicator. Moreover, the present disclosure relates to a method in a radio network node and a radio network node for enabling estimation of a channel quality indicator by a user equipment.

BACKGROUND

In telecommunication systems, it is often desired to estimate channel quality of a channel for sending data between a base station and a user equipment. When the channel quality has been estimated, the sending of data may be adapted to the estimated channel quality of the channel. As an example, by adapting the sending of data to the channel quality may be possible increase the data rate.

In a known telecommunication system, such as a Wideband Code Division Multiple Access (WCDMA) system, the channel quality is estimated by the user equipment and reported by the user equipment to the base station as a channel quality indicator (CQI). The channel quality indicator is based on measurements of signal strength for the sending of data and on measurements of signal strength for interference imposed to the sending of data. The measurements may be a measurement of signal-to-interference-ratio (SIR).

The signal strength for the sending of data may be estimated by measuring signal strength of reference signals, also called pilot symbols. The pilot symbols are transmitted in a slot of the WCDMA system. A transmission time interval (TTI) includes at least one slot. In the WCDMA system, 10 pilot symbols may be transmitted on a primary common pilot channel (P-CPICH) for each slot. Another 10 pilot symbols may be transmitted if a secondary common pilot channel (S-CPICH) is used. These pilot symbols are specified by a standard specification for high speed downlink packet access (HSDPA).

In the WCDMA system, a plurality of downlink channels may be associated to a plurality of codes for code division multiplexing. In this fashion, each downlink channel is associated to a respective code of said plurality of codes. A code that is not used for code division multiplexing of data may be referred to as an unused code or idle code. Thus, the signal strength for interference may be estimated by measuring on so called unused codes.

In the user equipment, the estimation of the CQI is based on combining weights. The combining weights are used to reduce so called colored interference. The user equipment comprises a Maximum Likelihood receiver (ML receiver), which calculates the combining weights, w, according to:

$$w = R^{-1}h$$

Where R and h are estimates of an impairments covariance matrix and a net channel response, respectively. The net channel response may be estimated by the signal strength of the reference signals. The receiver uses the impairments covariance matrix to reduce interference. For example, so called colored interference may be reduced by means of the impairments covariance matrix via the combining weights as mentioned above. The estimate h may be generated based on reference signals. Thus, by improving an estimate of the net channel response the calculated combining weights may become more accurate. As a consequence thereof, the reported CQI, based on the combining weights, may become more accurate as well.

For the ML receiver, the number of pilot symbols as given by the HSDPA specification may not be enough for computing reliable estimates of the signal strength for the sending of data. It has been noted that ML receivers and approximate ML receivers are sensitive to errors in the estimates.

In order to improve the reliability of the estimates, it is known to provide an additional S-CPICH such as to increase power available for pilot symbols. As a result, the accuracy of the estimates may be improved. However, a problem with this known approach is that the power for additional pilot symbols is determined by a fixed setting. Therefore, it may be cumbersome to change the power for additional pilot symbols.

SUMMARY

An object of embodiments herein is to improve performance of a telecommunication system.

According to an aspect, the object is achieved by a method in a user equipment for estimating a channel quality indicator, referred to as CQI. The user equipment and a radio network node are comprised in a radio communication system. A first reference signal, such as a pilot signal, is carried by a downlink channel of the radio communication system. The user equipment receives from the radio network node information about scheduling of a downlink transmission to the user equipment and information about a second reference signal being different from the first reference signal. Furthermore, the user equipment receives from the radio network node the downlink transmission. The downlink transmission comprises the first reference signal and the second reference signal. Next, the user equipment estimates the CQI based on the first reference signal, and the second reference signal by means of the information about the second reference signal.

According to another aspect, the object is achieved by a user equipment for estimating a channel quality indicator, CQI. The user equipment and a radio network node are comprised in a radio communication system. A first reference signal is carried by a downlink channel of the radio communication system. The user equipment comprises a receiver configured to receive from the radio network node information about scheduling of a downlink transmission to the user equipment and information about a second reference signal being different from the first reference signal. The receiver further is configured to receive from the radio network node the downlink transmission. The downlink transmission comprises the first reference signal and the second reference signal. The user equipment further comprises a processing circuit configured to estimate the CQI based on the first reference signal, and the second reference signal by means of the information about the second reference signal.

According to a further aspect, the object is achieved by a method in a radio network node for enabling estimation of a channel quality indicator, CQI, by a user equipment. The radio network node and the user equipment are comprised in a radio communication system. A first reference signal is carried by a downlink channel of the radio communication system. The radio network node sends to the user equipment information about scheduling of a downlink transmission to the user equipment and information about a second reference signal being different from the first reference signal. Furthermore, the radio network node sends to the user equipment the downlink transmission. The downlink transmission comprises the first reference signal and the second reference signal, thereby enabling estimation of the CQI by the user equipment.

According to yet another aspect, the object is achieved by a radio network node for enabling estimation of a channel quality indicator, CQI, by a user equipment. The radio network node and the user equipment are comprised in a radio communication system. A first reference signal is carried by a downlink channel of the radio communication system. The radio network node comprises a transmitter configured to send to the user equipment information about scheduling of a downlink transmission to the user equipment and information about a second reference signal being different from the first reference signal. The transmitter is further configured to send the downlink transmission to the user equipment. The downlink transmission comprises the first reference signal and the second reference signal, thereby enabling estimation of the CQI by the user equipment.

Since the user equipment receives from the radio network node information about scheduling of a downlink transmission to the user equipment and information about a second reference signal being different from the first reference signal, there will be additional reference signals, i.e. the second reference signal, available for estimation of the net channel response. This consequently improves the net channel response. Thus, combining weights may be more accurately determined as well. In turn, this leads to that a higher CQI may be reported by the user equipment to the radio network node. With a higher CQI performance of the radio communication system is improved. Hence, the above mentioned object is achieved.

An advantage of embodiments herein is that there is no delay in change of reference signals, since the information about the second reference signal is sent in conjunction with information about scheduling of the downlink transmission.

Another advantage of embodiments herein is that estimation of the net channel response for advanced receivers, such as ML receivers, may be improved without need for changes of related standard specifications.

BRIEF DESCRIPTION OF THE DRAWINGS

The various aspects of embodiments disclosed herein, including particular features and advantages thereof, will be readily understood from the following detailed description and the accompanying drawings, in which.

DETAILED DESCRIPTION

Figure 1:
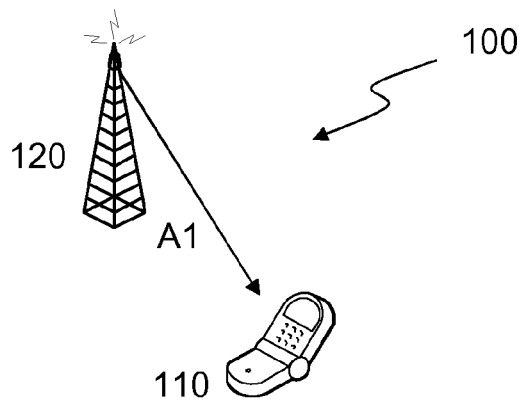
FIG. 1 shows a schematic overview of an exemplifying radio communication system.

Throughout the following description similar reference numerals have been used to denote similar elements, parts, items, network nodes or features, when applicable. In the Figures, features that appear in some embodiments are indicated by dashed lines.

FIG. 1 shows a schematic overview of an exemplifying radio communication system 100, such as a WCDMA system. The radio communication system 100 comprises a radio network node 120, such as a radio base station, and a user equipment 110. An arrow A1 indicates that a downlink transmission may be sent to the user equipment 110 from the radio network node 120. The downlink transmission may utilize one or more of a plurality of downlink channels. The downlink channels are associated to a plurality of codes for code division multiplexing. Each downlink channel is associated to a respective code of said plurality of codes for code division multiplexing.

As used herein, a user equipment may be a mobile phone, a cellular phone, a Personal Digital Assistant (PDA) equipped with radio communication capabilities, a smart phone, a laptop equipped with an internal or external mobile broadband modem, a portable electronic radio communication device or the like.

In the user equipment 110, the estimation of the CQI is based on combining weights. The combining weights are used to reduce so called colored interference. The user equipment 110 comprises a Maximum Likelihood receiver (ML receiver), which calculates the combining weights, w, according to:

$$w = R^{-1} h$$

Where R and h are estimates of an impairments covariance matrix and a net channel response, respectively. The net channel response may be estimated by the signal strength of the reference signals. The receiver uses the impairments covariance matrix to reduce interference. For example, so called colored interference may be reduced by means of the impairments covariance matrix via the combining weights as mentioned above. The estimate h may be generated based on reference signals. Thus, by improving an estimate of the net channel response the calculated combining weights may become more accurate. As a consequence thereof, the reported CQI, based on the combining weights, may become more accurate as well.

Figure 2:
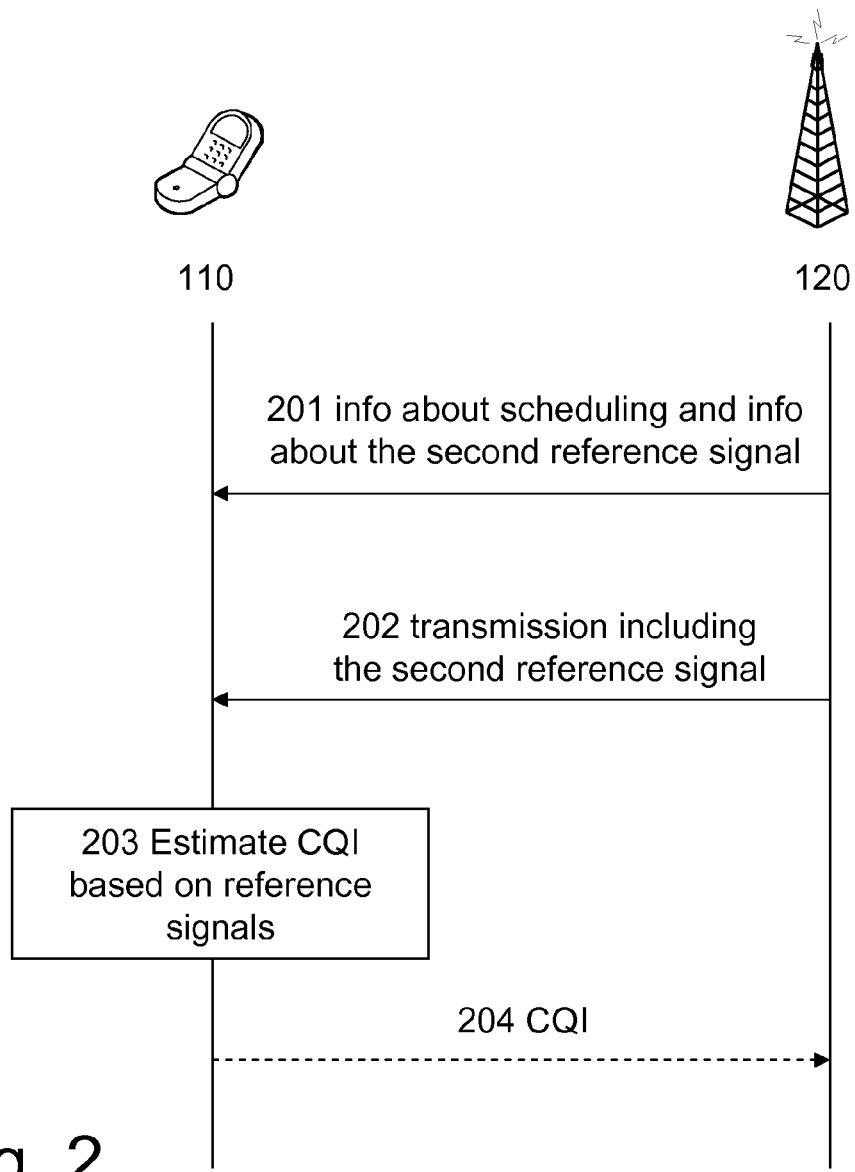
FIG. 2 shows a schematic, combined signalling and flow chart of an exemplifying method in the radio communication system according to FIG. 1 for estimating a channel quality indicator.

Turning to FIG. 2, there is shown a schematic combined signalling and flow chart of an exemplifying method in the radio communication system according to FIG. 1 for estimating a channel quality indicator. A first reference signal, such as a pilot signal, is carried by a downlink channel of the radio communication system 100. As an example, the pilot signal may be a pilot symbol. The first reference signal may be used for estimation of the CQI by the user equipment 110. The following actions, such as steps, may be performed. Notably, in some embodiments of the method the order of the actions may differ from what is indicated below and/or in the Figure.

Action 201

The radio network node 120 sends and the user equipment 110 receives information, referred to as "info" in the Figure, about scheduling of a downlink transmission and information about a second reference signal being different from the first reference signal. This means that the user equipment 110 receives information about the second reference signal as it would be scheduling information for another user equipment, but the user equipment 110 is aware of that the information sent as scheduling information for the other user equipment is intended to be information about the second reference signal for the user equipment 110. This will be further elaborate below in conjunction with a description of an identifier of an intended recipient.

Since the information about the second reference signal is sent frequently by the radio network node in conjunction with the information about scheduling of the downlink transmission, the radio network node 120 may perform fast and adaptive changes of the second reference signal as required by current radio conditions.

The fast, adaptive changes according to the current radio conditions may be in response to where there momentarily are free, unused codes. Therefore, as an example, the second reference signal may be scheduled to be transmitted using an unused code, which unused code defines an unused channel of the radio communication system 100. However, as another example, the second reference signal may be scheduled to be transmitted using any code, while the downlink transmission is scheduled while taking the second reference signal into account.

Furthermore, the fast, adaptive changes according to the current radio conditions may be in response to if the second reference signal is useful or not to the user equipment 110. As an example, the user equipment 110 may send an acknowledgement (ACK) message to the radio network node 120. The ACK message may be used to confirm that the user equipment 110 is configured, for example by means of software, to be able to handle the second reference signal. This will be referred to as an ACK mechanism further below. As an example, the HS-DPCCH HARQ-ACK (high speed downlink physical control channel hybrid automatic repeat request acknowledgment) in uplink may be used by the user equipment 110 to send an ACK for a transmission time interval (TTI) when no high-speed data is received from the radio network node 120. In this manner, the radio network node 120 may detect if the user equipment 110 uses the second reference signal. Hence, if it is detected that the user equipment 110 does not use the second reference signal, the radio network node 120 may turn off the sending of information about the second reference signal. Moreover, the radio network node 120 may store information about if the user equipment 110 uses the second reference signal or if it does not use the second reference signal.

Moreover, as an example, the information about the second reference signal may comprise information about modulation scheme, transport block size, power, code for code division multiplexing and the like, for the second reference signal.

In some embodiments, the information about scheduling of the downlink transmission is determined by the radio network node 120 while taking the second reference signal into account. Hence, as an example, the information about scheduling of the downlink transmission is determined based on the second reference signal.

In some embodiments, the information about scheduling is carried by a first shared control channel, such a first high-speed shared control channel (HS-SCCH). Expressed differently, the information about scheduling is received on the first shared control channel.

Moreover, the information about the second reference signal may be carried by a second shared control channel, such as a second HS-SCCH. This means that the information about the second reference signal is scheduled to the user equipment 110. In this manner, it may be assured that the information about the second reference signal is accurately valid for the downlink transmission to be received by the user equipment 110.

In some embodiments, the second shared control channel is identified by an identifier for identifying an intended recipient, such as another user equipment, of the information carried by the second shared control channel, which identifier is received by the user equipment 110 from the radio network node 120. In this manner, by being informed about the identifier that represents another user equipment, the user equipment 110 is capable of receiving information about the second reference signal carried by the second shared control channel.

When the user equipment 110 has received the information about the scheduling and the information about the second reference signal, the user equipment 110 may decode the information about scheduling and the information about the second reference signal.

As an example, the second HS-SCCH may have a specific user equipment identifier which is not associated to the user equipment 110, but to another user equipment. However, since the user equipment 110 has received the identifier, the user equipment 110 will be able to receive and capture information about the second reference signal sent on the second HS-SCCH with the specific user equipment identifier. If the user equipment 110 successfully decodes the information on the second HS-SCCH for the second reference signal, it uses the second reference signal when making measurements for computing the impairment covariance matrix.

It is to be understood that in some embodiments the identifier for identifying an intended recipient of the information carried by the second shared control channel may be predetermined. In this manner, no signalling of the identifier is required.

Now that the identifier has been explained, it may be noted that the first shared control channel may have a first identifier, such as a user equipment identifier, that is associated to the user equipment 110. As a result, the user equipment 110 will be able to receive and capture the information about scheduling as intended.

Action 202

The radio network node 120 sends the scheduled downlink transmission, which is received by the user equipment 110. The downlink transmission comprises the first reference signal and the second reference signal, thereby enabling estimation of the CQI by the user equipment 110 according to action 203 below.

Action 203

The user equipment 110 estimates the CQI based on the first reference signal, and the second reference signal by means of the information about the second reference signal. Thanks to the increase in number of reference signals, the power available for reference signals is increased. With increased power for reference signals, the user equipment 110 is able to improve an estimate of the net channel response referred to above. As a consequence, also the combining weights are improved according to w=$R^{-1}$ h above. Next, the estimate of the CQI is improved since the combining weights have been improved.

Action 204

In some embodiments, the user equipment 110 sends and the radio network node 120 receives the estimated CQI. Thus, the user equipment 110 has reported the CQI to the radio network node 120.

In some embodiments, the radio network node 120 may adjust modulation, transport block size (TrBlkSize) and the like based the received CQI. In this manner the downlink transmission is adapted to the current radio conditions.

Figure 3:
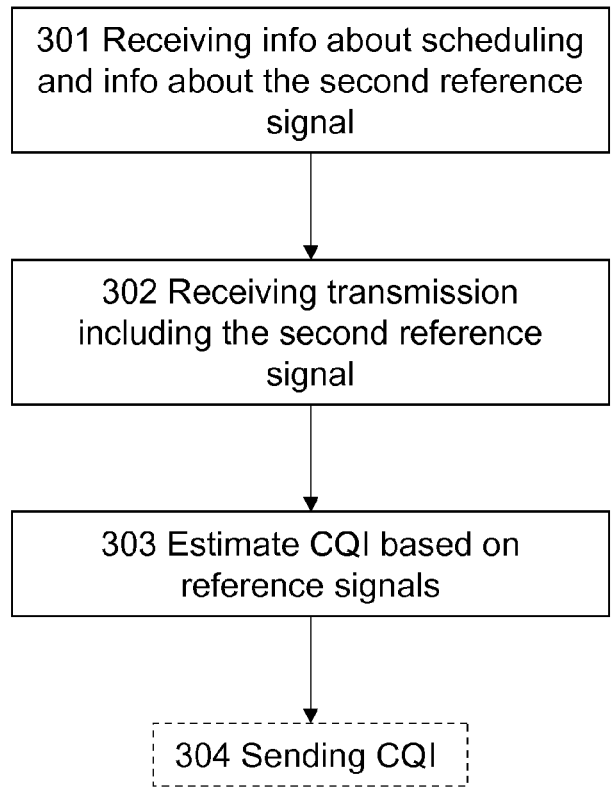
FIG. 3 shows a schematic flow chart of the method of FIG. 2 when seen from the user equipment.

In FIG. 3, there is shown an exemplifying, schematic flow chart of the method of FIG. 2 when seen from the user equipment 110. The user equipment 110 performs a method for estimating the CQI. As mentioned above, the user equipment 110 and the radio network node 120 are comprised in the radio communication system 100. A first reference signal, such as a pilot signal, is carried by a downlink channel of the radio communication system 100. As an example, the pilot signal may be a pilot symbol. The first reference signal may be used for estimation of the CQI by the user equipment 110. The following actions may be performed. Notably, in some embodiments the order of the actions may differ from what is indicated below and/or in the Figure.

Action 301

Action 301 is similar to action 201. The user equipment 110 receives from the radio network node 120, information about scheduling of a downlink transmission to the user equipment 110 and information about a second reference signal being different from the first reference signal.

In some embodiments of the method in the user equipment 110, the information about scheduling is carried by a first shared control channel, such a first high-speed shared control channel (HS-SCCH).

Moreover, the information about the second reference signal is carried by a second shared control channel, such as a second HS-SCCH. Thus, the information about the second reference signal is scheduled to the user equipment 110. In this manner, it may be assured that the information about the second reference signal is accurately valid for the downlink transmission to be received by the user equipment 110.

In some embodiments of the method in the user equipment 110, the second shared control channel is identified by an identifier for identifying an intended recipient of the information carried by the second shared control channel, which identifier is received by the user equipment 110 from the radio network node 120. In this manner, the user equipment 110 is capable of receiving information about the second reference signal carried by the second shared control channel by means of the identifier. As an example, the second HS-SCCH can have a specific user equipment identifier which is not associated to the user equipment 110. However, since the user equipment 110 has received the identifier, the user equipment 110 will be able to receive and capture information about the second reference signal sent on the second HS-SCCH with the specific user equipment identifier. If the user equipment 110 successfully decodes the information on the second HS-SCCH for the second reference signal, it uses the second reference signal when computing the impairment covariance matrix. The first shared control channel may have a first identifier, such as a user equipment identifier, that is associated to the user equipment 110. As a result, the user equipment 110 will be able to receive and capture the information about scheduling as intended. As an example, the user equipment 110 may decode information about scheduling and information about the second reference signal.

In some embodiments of the method in the user equipment 110, the downlink channel for the first reference signal is a primary common pilot channel (P-CPICH) or a secondary common pilot channel (S-CPICH). In contrast, as an example, the second reference signal is sent on a channel, using some specific code, as specified by the information about the second reference signal.

In some embodiments of the method in the user equipment 110, the identifier for identifying an intended recipient is a user equipment identifier, sometimes denoted UE_id.

In some embodiments of the method in the user equipment 110, the information about scheduling and the information about the second reference signal are received in a first transmission time interval (TTI).

Action 302

Action 302 is similar to action 202. The user equipment 110 receives from the radio network node 120 the downlink transmission. The downlink transmission comprises the first reference signal and the second reference signal.

In some embodiments of the method in the user equipment 110, the downlink transmission is received on a physical downlink shared channel, such as a high-speed physical downlink shared channel (HS-PDSCH).

In some embodiments of the method in the user equipment 110, the downlink transmission is received in a second transmission time interval. The second transmission time interval may be subsequent the first transmission time interval. As an example, the second transmission time interval may be directly adjacent the first transmission time interval.

Action 303

Action 303 is similar to action 203. The user equipment 110 estimates the CQI based on the first reference signal, and the second reference signal by means of the information about the second reference signal.

Action 304

Action 304 is similar to action 204. In some embodiments of the method in the user equipment 110, the user equipment 110 sends the estimated CQI to the radio network node 120.

Figure 4:
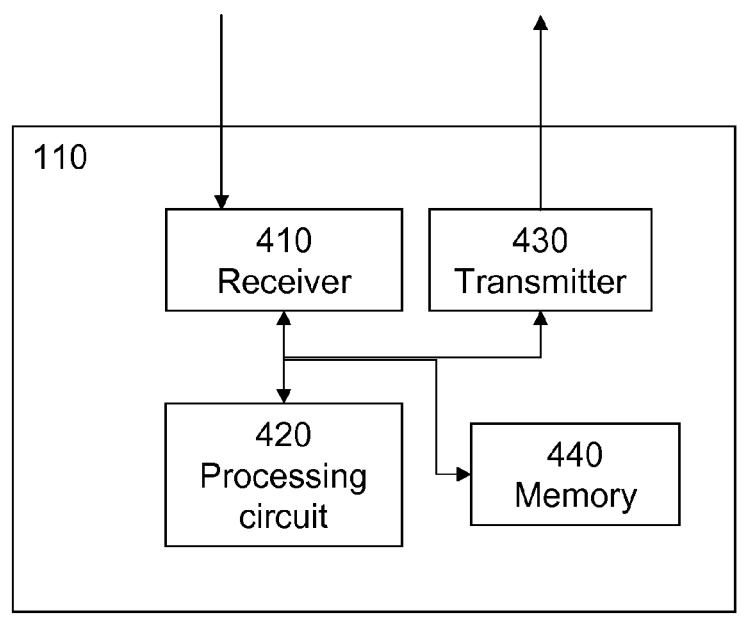
FIG. 4 shows a schematic block diagram of an exemplifying user equipment configured to estimate a channel quality indicator.

With reference to FIG. 4, there is shown a schematic block diagram of the user equipment 110 configured to perform the actions above for estimation of the CQI. As mentioned above, the user equipment 110 and the radio network node 120 are comprised in the radio communication system 100. A first reference signal is carried by a downlink channel of the radio communication system 100. The first reference signal may be used by the user equipment 110 for estimation of the CQI.

In some embodiments of the user equipment 110, the downlink channel for the first reference signal is P-CPICH or S-CPICH.

The user equipment 110 comprises a receiver 410 configured to receive from the radio network node 120 information about scheduling of a downlink transmission to the user equipment 110 and information about a second reference signal being different from the first reference signal. The receiver 410 further is configured to receive from the radio network node 120 the downlink transmission. The downlink transmission comprises the first reference signal and the second reference signal.

In some embodiments of the user equipment 110, the receiver 410 is further configured to receive the information about scheduling and the information about the second reference signal in a first transmission time interval.

In some embodiments of the user equipment 110, the receiver 410 is further configured to receive the downlink transmission in a second transmission time interval.

In some embodiments of the user equipment 110, the receiver 410 is further configured to receive the downlink transmission on a physical downlink shared channel.

In some embodiments of the user equipment 110, the receiver 410 further is configured to receive the information about scheduling on a first shared control channel and the information about the second reference signal on a second shared control channel.

In some embodiments of the user equipment 110, the second shared control channel is identified by an identifier for identifying an intended recipient of the information carried by the second shared control channel. As an example, the receiver 410 may be configured to receive the identifier. In this manner, the user equipment 110 is capable of receiving information about the second reference signal carried by the second shared control channel by means of the identifier.

In some embodiments of the user equipment 110, the identifier for identifying an intended recipient is a user equipment identifier.

The user equipment 110 further comprises a processing circuit 420 configured to estimate the CQI based on the first reference signal and the second reference signal. In some embodiments of the user equipment 110, the processing circuit 420 may be a processing unit, a processor, an application specific integrated circuit (ASIC), a field-programmable gate array (FPGA) or the like. As an example, a processor, an ASIC, an FPGA or the like may comprise one or more processor kernels.

In some embodiments of the user equipment 110, the user equipment 110 may further comprise a memory 440 for storing software to be executed by, for example, the processing circuit. The software may comprise instructions to enable the processor to perform the method in the user equipment 110 as described above in conjunction with FIG. 3. The memory 440 may be a hard disk, a magnetic storage medium, a portable computer diskette or disc, flash memory, random access memory (RAM) or the like. Furthermore, the memory may be an internal register memory of a processor.

In some embodiments of the user equipment 110, the user equipment 110 further comprises a transmitter 430 configured to send the estimated CQI to the radio network node (120).

As an example, the user equipment 110 may comprise a ML receiver, which comprises the receiver 410, the processing circuit 420 and the memory 440.

Figure 5:
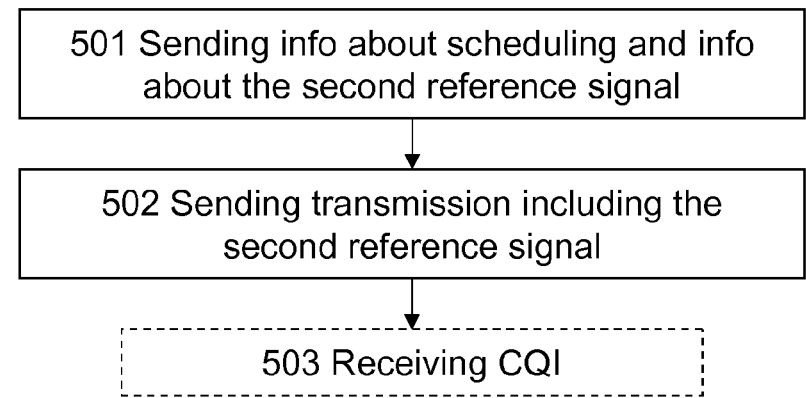
FIG. 5 shows a schematic flow chart of the method of FIG. 2 when seen from the radio network node.

In FIG. 5, there is shown a schematic flow chart of an exemplifying method in the radio network node 120 for enabling estimation of the CQI, by a user equipment 110. FIG. 5 describes the method of FIG. 2 when seen from the radio network node 120. As mentioned above, the radio network node 120 and the user equipment 110 are comprised in the radio communication system 100. A first reference signal is carried by a downlink channel of the radio communication system 100. The following actions may be performed. Notably, the order of the actions may in some embodiments differ from what is indicated below and/or in the Figure.

Action 501

Action 501 is similar to action 201. The radio network node 120 sends to the user equipment 110 information about scheduling of a downlink transmission to the user equipment 110 and information about a second reference signal being different from the first reference signal.

In some embodiments of the method in the radio network node 120, the information about scheduling of the downlink transmission is determined by the radio network node 120 while taking the second reference signal into account. This means that the radio network node 120 uses the information about the second reference signal when determining the information about scheduling of the downlink transmission.

In some embodiments of the method in the radio network node 120, the information about scheduling is carried by a first shared control channel, such as a high-speed shared control channel (HS-SCCH). Moreover, the information about the second reference signal is carried by a second shared control channel, such as a high-speed shared control channel (HS-SCCH).

In some embodiments of the method in the radio network node 120, the second shared control channel is identified by an identifier for identifying an intended recipient of the information carried by the second shared control channel, which identifier is sent by the radio network node 120 to the user equipment 110. In this manner, the user equipment 110 is capable of receiving information about the second reference signal carried by the second shared control channel by means of the identifier.

In some embodiments of the method in the radio network node 120, the identifier for identifying an intended recipient is a user equipment identifier.

In some embodiments of the method in the radio network node 120, the information about scheduling and the information about the second reference signal are sent in a first transmission time interval.

In some embodiments of the method in the radio network node 120, the downlink channel for the first reference signal is P-CPICH or S-CPICH.

In some embodiments of the method in the radio network node 120, it may be possible to turn off the use of the second reference signal. Thus, when the radio network node 120 detects that the reported CQI does not increase thanks to use of the second reference signal, the radio network node 120 turns off the sending of information about the second reference signal. The radio network node 120 may also detect that the user equipment 110 does not use the second reference signal by means of the previously mentioned ACK mechanism.

Action 502

Action 502 is similar to action 202. The radio network node 120 sends to the user equipment 110 the downlink transmission. The downlink transmission comprises the first reference signal and the second reference signal, thereby enabling estimation of the CQI by the user equipment 110.

In some embodiments of the method in the radio network node 120, the downlink transmission is sent on a physical downlink shared channel, such as a high-speed physical downlink shared channel (HS-PDSCH).

In some embodiments of the method in the radio network node 120, the downlink transmission is sent in a second transmission time interval.

Action 503

Action 503 is similar to action 204.

In some embodiments of the method in the radio network node 120, the radio network node 120 receives the CQI estimated by the user equipment 110 from the user equipment 110. Thus, the user equipment 110 has reported the CQI to the radio network node 120. The CQI is estimated based both on the first and second reference signals.

Figure 6:
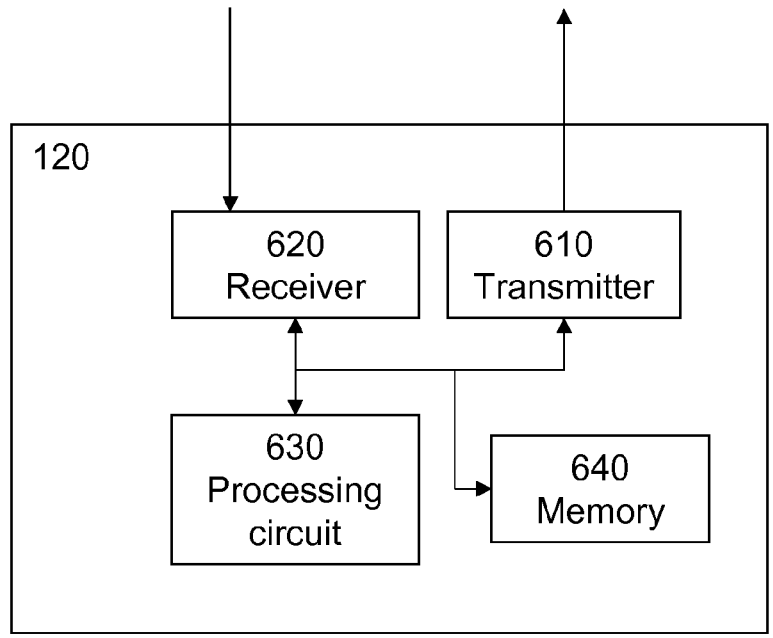
FIG. 6 shows a schematic block diagram of an exemplifying radio network node configured to enable estimation of a channel quality indicator by a user equipment.

To perform the actions above for enabling estimation of the CQI, the radio network node 120 comprises an arrangement depicted in FIG. 6. As mentioned above, the radio network node 120 and the user equipment 110 are comprised in a radio communication system 100. A first reference signal is carried by a downlink channel of the radio communication system 100.

In some embodiments of the radio network node 120, the downlink channel for the first reference signal is a primary common pilot channel, P-CPICH, or a secondary common pilot channel, S-CPICH.

The radio network node 120 comprises a transmitter 610 configured to send, to the user equipment 110, information about scheduling of a downlink transmission to the user equipment 110 and information about a second reference signal being different from the first reference signal. The transmitter 610 is further configured to send the downlink transmission to the user equipment 110. The downlink transmission comprises the first reference signal and the second reference signal, thereby enabling estimation of the CQI by the user equipment 110.

In some embodiments of the radio network node 120, the transmitter 610 is further configured to send the downlink transmission on a physical downlink shared channel.

In some embodiments of the radio network node 120, the transmitter 610 is further configured to send the information about scheduling and the information about the second reference signal in a first transmission time interval.

In some embodiments of the radio network node 120, the transmitter 610 is further configured to send the downlink transmission in a second transmission time interval.

In some embodiments of the radio network node 120, the transmitter 610 is further configured to send the information about scheduling on a first shared control channel and the information about the second reference signal on a second shared control channel.

In some embodiments of the radio network node 120, the second shared control channel is identified by an identifier for identifying an intended recipient of the information carried by the second shared control channel, which identifier is sent by the radio network node 120 to the user equipment 110.

In some embodiments of the radio network node 120, the identifier for identifying an intended recipient is a user equipment identifier.

In some embodiments of the radio network node 120, the radio network node 120 further comprises a processing circuit 630. The processing circuit 630 may be a processing unit, a processor, an application specific integrated circuit (ASIC), a field-programmable gate array (FPGA) or the like. As an example, a processor, an ASIC, an FPGA or the like may comprise one or more processor kernels.

In some embodiments of the radio network node 120, the information about scheduling of the downlink transmission is determined by the radio network node 120 while taking the second reference signal into account. As an example, the processing circuit 630 may be configured to determine the information about scheduling while taking the second reference signal into account. This means that the second reference signal is not used for sending data, but is instead used for transmission of for example a pilot code as given by the information about the second reference signal.

In some embodiments of the radio network node 120, the radio network node 120 may further comprise a memory 640 for storing software to be executed by, for example, the processing circuit. The software may comprise instructions to enable the processor to perform the method in the radio network node 120 as described above in conjunction with FIG. 5. The memory 640 may be a hard disk, a magnetic storage medium, a portable computer diskette or disc, flash memory, random access memory (RAM) or the like. Furthermore, the memory may be an internal register memory of a processor.

In some embodiments of the radio network node 120, the radio network node 120 further comprises a receiver 620 configured to receive the CQI estimated by the user equipment 110 from the user equipment 110.

Furthermore, it has been noted that the reported CQI may depend on the power of reference signals, such as pilot signals, pilot symbols or pilot codes, available to the user equipment. For the radio network node to select proper transport block size, number of codes, modulation and power when transmitting new HS-data (high speed data) to the user equipment, the radio network node may need to adjust for the number of reference signals (and power thereof) that was available when the CQI was estimated and the current available power for reference signals, i.e. power of P-CPICH, S-CPICH and additional pilots, such as the second reference signal. If the power available for reference signals changes from when the CQI was reported until it is to be used, the radio network node may predict the corresponding change in CQI. The radio network node may estimate the corresponding change by computing a difference in the reported CQI every time the power available for reference signals changes. Based on the corresponding change in CQI and the received CQI, the radio network node may then more accurately select transport block size, number of codes, modulation and power in view of the present channel quality indicator.

In addition to the advantages mentioned in section summary, a further advantage of the methods, the user equipment 110 and the radio network node 120 presented herein may be that implementation only requires an update of software in the radio network node and in the user equipment.

Moreover, since the added computational load due to the methods presented herein is small, both for the radio network node and for the user equipment, hardware changes are not expected to be needed.

Furthermore, the power consumption of the user equipment 110 is not expected to be affected by the introduction of the methods presented herein.

Figure 7:
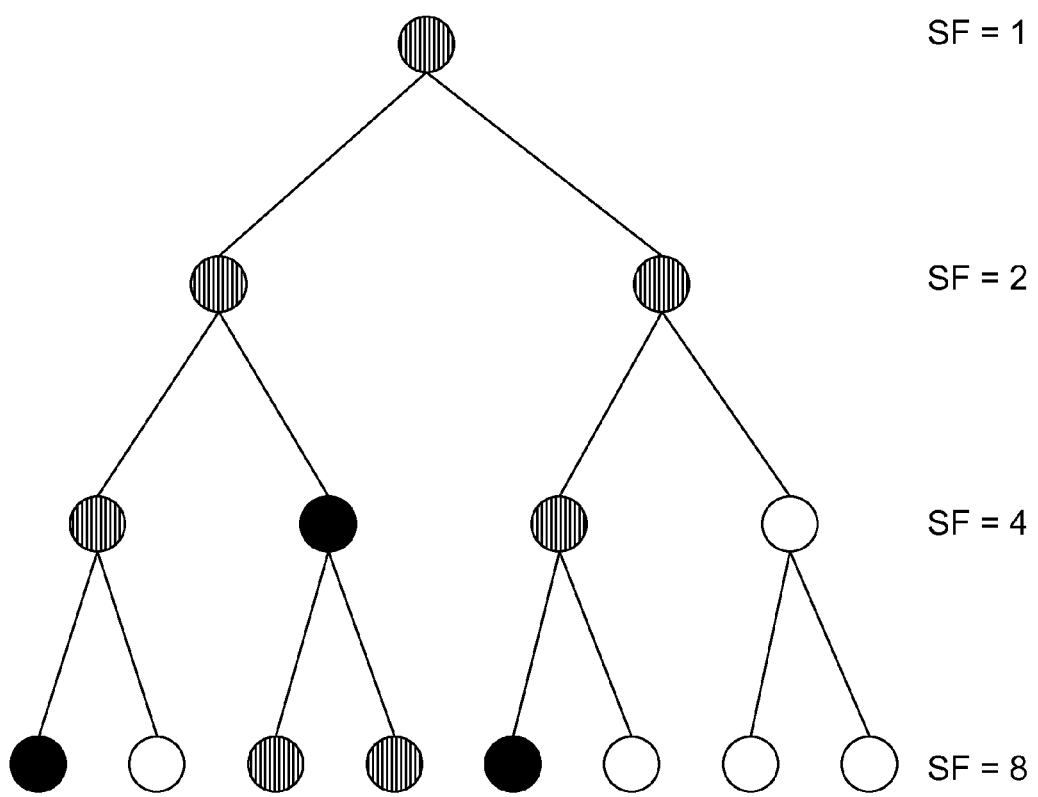
FIG. 7 shows a schematic diagram of an exemplifying code tree.

Now turning to FIG. 7, there is shown a schematic, exemplifying code tree. With reference to the code tree shown in FIG. 7, it will be further explained which codes are considered to be used and unused with respect to a code that is used in a transmission of data. In the Figure each node of the code tree is indicated by black solid, striped and empty (or white) bullets. Each bullet represents a code for code division multiplexing.

The first row comprising only one bullet, SF=1, represents a code with spreading factor (SF) one. The second row SF=2 of bullets represents codes with spreading factor two. Similarly, the third and fourth rows of bullets represent codes with spreading factors four and eight, respectively. Codes, shown as bullets in the Figure, located in the same row have the same spreading factor but different channelization codes. Black solid bullets denote codes that are used. Striped bullets denote codes that are unavailable due to used codes (black solid bullets). White bullets denote codes that are so called unused codes or idle codes. The spreading factor is known to be the ratio of a chip rate and a symbol rate. The chip rate of a code is the number of pulses per second (chips per second) at which the code is transmitted (or received). The symbol rate is the number of symbols per second at which symbols are transmitted (or received). The chip rate is larger than the symbol rate, meaning that one symbol may be represented by multiple chips. The channelization code is used for separation of information to be transmitted (or received) on different channels.

Even though embodiments of the various aspects have been described, many different alterations, modifications and the like thereof will become apparent for those skilled in the art. The described embodiments are therefore not intended to limit the scope of the invention, which is defined by the appended claims.

The invention claimed is:

1. A method in a user equipment for estimating a channel quality indicator, CQI, wherein the user equipment and a radio network node are comprised in a radio communication system, wherein a first reference signal is carried by a downlink channel of the radio communication system, wherein the method comprises:

receiving from the radio network node, information about scheduling of a downlink transmission to the user equipment, and information about a second reference signal being different from the first reference signal, wherein the information about the second reference signal comprises one or more of: a modulation scheme of the second reference signal, a transport block size for the second reference signal, a power of the second reference signal, and a code for code division multiplexing for the second reference signal;

receiving from the radio network node the downlink transmission according to the received information about scheduling of the downlink transmission, wherein the downlink transmission comprises the first reference signal and the second reference signal; and estimating the CQI based on the first reference signal, and the second reference signal by means of the information about the second reference signal.

2. The method in the user equipment according to claim 1, wherein the method further comprises:

sending the estimated CQI to the radio network node.

3. The method in the user equipment according to claim 1, wherein the information about scheduling is carried by a first shared control channel and the information about the second reference signal is carried by a second shared control channel.

4. The method in the user equipment according to claim 3, wherein the second shared control channel is identified by an identifier for identifying an intended recipient of the information carried by the second shared control channel, which identifier is received by the user equipment from the radio network node.

5. The method in the user equipment according to claim 4, wherein the identifier for identifying an intended recipient is a user equipment identifier.

6. The method in the user equipment according to claim 1, wherein the receiving of the downlink transmission is received on a physical downlink shared channel.

7. The method in the user equipment according to claim 1, wherein the downlink channel is a primary common pilot channel, P-CPICH, or a secondary common pilot channel, S-CPICH.

8. The method in the user equipment according to claim 1, wherein the receiving of information about scheduling and information about the second reference signal is received in a first transmission time interval.

9. The method in the user equipment according to claim 1, wherein the receiving of the downlink transmission is received in a second transmission time interval.

10. A user equipment for estimating a channel quality indicator, CQI, wherein the user equipment and a radio network node are comprised in a radio communication system, wherein a first reference signal is carried by a downlink channel of the radio communication system, wherein the user equipment comprises:

a receiver configured to receive from the radio network node information about scheduling of a downlink transmission to the user equipment and information about a second reference signal being different from the first reference signal, the information about the second reference signal comprises one or more of: a modulation scheme of the second reference signal, a transport block size for the second reference signal, a power of the second reference signal, and a code for code division multiplexing for the second reference signal, wherein the receiver further is configured to receive from the radio network node the downlink transmission according to the received information about scheduling of the downlink transmission, wherein the downlink transmission comprises the first reference signal and the second reference signal, and a processing circuit configured to estimate the CQI based on the first reference signal and the second reference signal.

11. A method in a radio network node for enabling estimation of a channel quality indicator, CQI, by a user equipment, wherein the radio network node and the user equipment are comprised in a radio communication system, wherein a first reference signal is carried by a downlink channel of the radio communication system, wherein the method comprises:

sending to the user equipment information about scheduling of a downlink transmission to the user equipment and information about a second reference signal being different from the first reference signal, wherein the information about the second reference signal comprises one or more of: a modulation scheme of the second reference signal, a transport block size for the second reference signal, a power of the second reference signal, and a code for code division multiplexing for the second reference signal; and sending to the user equipment the downlink transmission according to the sent information about scheduling of the downlink transmission, wherein the downlink transmission comprises the first reference signal, and the second reference signal by means of the information about the second reference signal, thereby enabling estimation of the CQI by the user equipment.

12. The method in the radio network node according to claim 11, wherein the information about scheduling is carried by a first shared control channel and the information about the second reference signal is carried by a second shared control channel.

13. The method in the radio network node according to claim 12, wherein the second shared control channel is identified by an identifier for identifying an intended recipient of the information carried by the second shared control channel, which identifier is sent by the radio network node to the user equipment.

14. The method in the radio network node according to claim 13, wherein the identifier for identifying an intended recipient is a user equipment identifier.

15. The method in the radio network node according to claim 11, wherein the information about scheduling of the downlink transmission is determined by the radio network node while taking the second reference signal into account.

16. The method in the radio network node according to claim 11, wherein the method further comprises:

receiving the CQI estimated by the user equipment from the user equipment.

17. The method in the radio network node according to claim 11, wherein the sending of the downlink transmission is sent on a physical downlink shared channel.

18. The method in the radio network node according to claim 11, wherein the downlink channel is a primary common pilot channel, P-CPICH, or a secondary common pilot channel, S-CPICH.

19. The method in the radio network node according to claim 11, wherein the sending of information about scheduling and information about the second reference signal is sent in a first transmission time interval.

20. The method in the radio network node according to claim 11, wherein the sending of the downlink transmission is sent in a second transmission time interval.

21. A radio network node for enabling estimation of a channel quality indicator, CQI, by a user equipment, wherein the radio network node and the user equipment are comprised in a radio communication system, wherein a first reference signal is carried by a downlink channel of the radio communication system, wherein the radio network node comprises:
a transmitter configured to send, to the user equipment, information about scheduling of a downlink transmission to the user equipment and information about a second reference signal being different from the first reference signal, the information about the second reference signal comprises one or more of: a modulation scheme of the second reference signal, a transport block size for the second reference signal, a power of the second reference signal, and a code for code division multiplexing for the second reference signal, wherein the transmitter further is configured to send, to the user equipment, the downlink transmission according to the sent information about scheduling of the downlink transmission, wherein the downlink transmission comprises the first reference signal and the second reference signal, thereby enabling estimation of the CQI by the user equipment.

* * * * *